Patented Nov. 30, 1926.

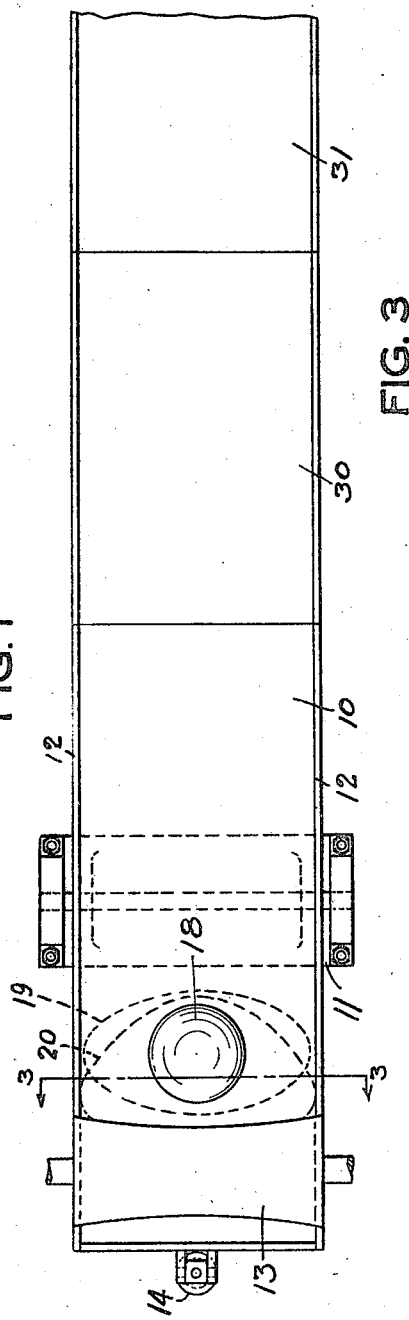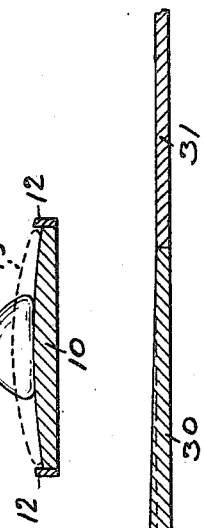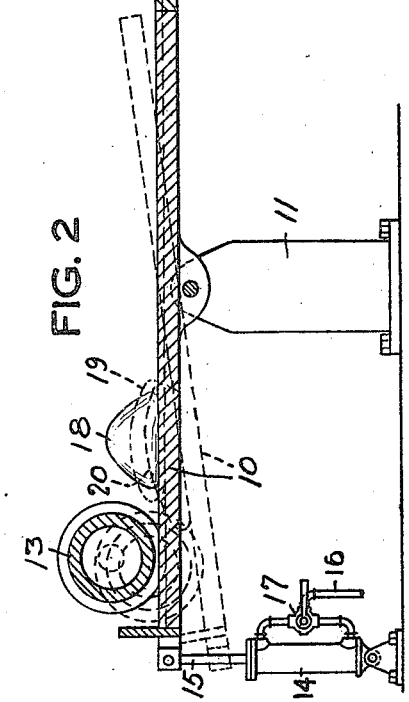

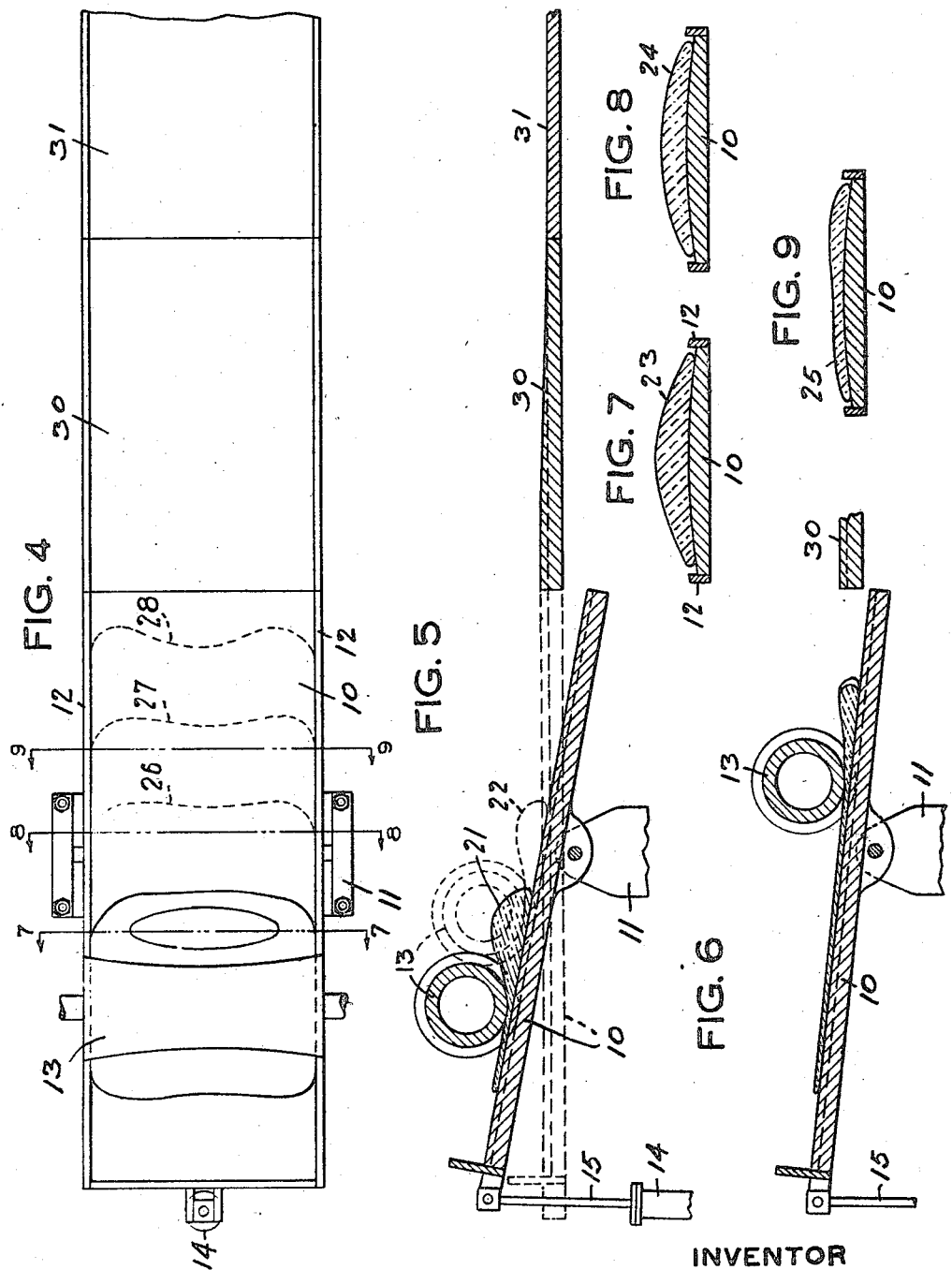

1,608,657

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

METHOD OF AND APPARATUS FOR FORMING SHEET GLASS.

Application filed March 13, 1926. Serial No. 94,448.

My invention relates to a method and apparatus for forming sheet glass, and more particularly to the rolling of plate glass, and constitutes an improvement upon my application, Serial No. 88,823, filed February 17, 1926.

In the rolling of plate glass upon a table it has been customary to dump a mass of molten glass from a pot in quantity sufficient to form a single plate and then spread such glass by a sheet-forming roll. If no effort is made to spread the mass of glass toward the edges of the table previous to commencement of the rolling operation, a large mass of glass is banked against the roll and particles thereof become chilled, and thereafter mixed with the hotter glass, thus causing the presence of "ream" in the finished sheet. Furthermore, the sheet so formed is unduly elongated or of generally elliptical shape because the roll travels a considerable distance before the glass which is massed at its mid portion can spread to the edges of the table, and at the forward end of the sheet a similar protuberance is formed adjacent to the longitudinal center line of the table. Inasmuch as the plates of glass are cut to rectangular form, there is a large amount of waste by reason of the necessity of trimming off these elongated end portions.

On the other hand, if the glass is spread across the table, to the front of the roll, by moving the pot while pouring, or by dragging portions of the deposited mass of glass toward the edge of the table, through the use of hooks or otherwise, laps, seams and other imperfections are formed in the finished sheet of glass. It is highly important that the glass be distributed on the table with a minimum amount of disturbance and a minimum amount of banking or piling up against the sheet-forming roll.

One object of my invention is to provide a means and a method whereby spreading movement of the mass of glass entering into a sheet is effected largely by the action of gravity.

Another object of my invention is to simplify and improve generally the methods of and apparatus for forming sheet glass.

One means by which my invention may be practiced is shown in the accompanying drawing, wherein Fig. 1 is a plan view of a casting table and a sheet-forming roll; Fig. 2 is an elevational sectional view of the apparatus of Fig. 1; Fig. 3 is a sectional view taken on the line 3—3 of Fig. 1; Fig. 4 is a plan view of the apparatus of Fig. 1, but showing, diagrammatically, contours of the molten glass at various stages of the sheet forming operation; Fig. 5 shows the position occupied by the casting table at an early stage of the sheet-forming operation; Fig. 6 shows the position occupied by the table at a later stage in the operation, and Figs. 7, 8 and 9 are views taken on the lines 7—7, 8—8 and 9—9, respectively, of Fig. 4.

A convex casting table 10 is pivotally mounted upon a base 11 and is provided with marginal ribs 12 upon which a sheet-forming roll 13 is supported and which therefore determine the thickness of the plate of glass that is formed upon the table. The sheet-forming roll 13 is concave to conform to the convexity of the table 10.

In order to oscillate the table 10 about its pivot, I may provide any suitable means such as a piston and cylinder device 14 that operates a piston rod 15 that is pivotally connected to the rear end of the table. Fluid pressure is admitted from a supply pipe 16 past a control valve 17 to either the upper or lower side of the piston (not shown) within the cylinder.

The table 10 is convex in cross section, as shown more clearly in Fig. 3, in order to facilitate the flow of a mass of molten glass 18 toward the edges of the table. If the molten mass 18 is deposited upon the table when the roller and the table occupy the positions indicated in Figs. 1 and 2, the mass 18 will assume the contour 19, thus avoiding the necessity of moving the pot across the table while pouring, to effect spreading of the glass, or of using hooks or scoops to spread the mass 18.

In order, however, to fill in the corner portions of the table immediately adjacent to the ends of the roll 13, the table is tilted to the position indicated by dotted lines in Fig. 2, thus causing the glass to flow back against the roll and assume substantially the contour indicated by the dotted lines 20. It will thus be seen that this end of the completed sheet of glass will require but little trimming in order to "square" the same, and that the glass is distributed largely by gravitational flow and without excessive disturbance thereof. Furthermore there is no substantial massing or piling of the glass against the roll, thereby avoiding excessive chilling of certain portions thereof.

When the glass has assumed the contour indicated at 20, the valve 17 is actuated to raise the rear end of the table 10 to the position shown in Fig. 5. The glass therefore tends to flow toward the forward end of the table as indicated by the line 21, and that portion of the mass directly in contact with the roll 13 is but little thicker than the finished sheet. As the glass advances forwardly of the table, the mass 21 will become reduced to the extent indicated at 22. Thereupon the table can be gradually returned toward horizontal position as indicated in Fig. 6, since it is necessary that sufficient thickness be maintained at the mid portion of the table. Various stages of reduction in thickness of the stream of glass during progress of the roller are shown in cross section by the outlines 23, 24 and 25, in Figs. 7, 8 and 9, respectively.

The forward edge of the stream will be gradually brought to the contours indicated at 26, 27 and 28, in Fig. 4. Since it is extremely difficult to completely fill out the corners of the sheet and avoid any trimming, the contour at 28 is such as to permit the trimming of the forward end of the sheet on a straight line with a minimum amount of loss, since the mid portion of the sheet does not project forwardly beyond the corner portions thereof.

After the sheet has been formed, and while it is somewhat plastic, it is advanced across an apron or table section 30 to a table section 31 from which it is passed into a leer (not shown). The table section 30 has a surface that is convex at that end which adjoins the table 10 and is gradually reduced to a horizontal plane at that end which adjoins the table 31. The sheet of glass is of sufficiently high temperature when removed from the table 10 that it will flatten of its own weight upon the table sections 30 and 31.

In the practical operation of my method the exact timing of the various phases of the operations, the co-ordination of table movements and the roller movements and the pot tipping movements will be susceptible of a great variety of combinations. The size and thickness of a finished sheet, temperature of the glass and other conditions determine the particular thing to be done that will result in the best final product.

This invention is therefore aimed to cover various combinations by which the various steps which are new are thus correlated. For instance, it may be advisable to cast the pot of glass upon the table while the table is in a horizontal position, or this can be done when in a backwardly inclined position, or while the table is moving from a horizontal to an inclined position, or from an inclined position to a horizontal position, whichever is best for the proper spreading of the glass under the conditions at which it is being cast.

The spreading, on the other hand, may require that the roll be started while the table is in a backwardly inclined position, the roller thus going up-hill at first, or the roller may be started conjointly with the upward rise of the table from an inclined position, or the roller may be started while the glass is still spreading and the table is still dropping in a backwardly inclined position. Movement of the roll may also be delayed until the table has been restored to a horizontal position. The rolling may consist of a start while the table is in an inclined position, continued for a space while in a horizontal position and then continued for a time with the table in a forwardly inclined position and finally be finished with the table back again to a horizontal level. Again, it may be found best to start the rolling and change the position of the table from a backwardly inclined position to a forwardly inclined position and back again to horizontal without pausing in any certain position, but having these movements continuous.

Finally, the table may be inclined during the entire operation of rolling the glass, keeping the same inclination throughout said rolling process, then tilting it to a horizontal position to allow the finished plate to be transferred to the lehr. This rolling would then preferably be done while the table is tipping backwardly, the glass flowing against and resisting the travel of the roll.

I claim as my invention:

1. The step in the process of forming sheet glass which comprises depositing a mass of molten glass upon the lower portion of an inclined surface, and then tilting the surface to reverse the direction of incline and thereby cause the glass to flow toward the opposite end of said surface.

2. The step in the process of forming sheet glass, which comprises depositing a mass of molten glass upon the lower portion of an inclined surface that is convex in cross section, and then tilting the surface to reverse the direction of incline and thereby cause the glass to flow toward the opposite end of said surface.

3. The method of forming sheet glass, which comprises depositing a mass of molten glass upon the lower portion of an inclined surface, and then tilting the said surface toward a horizontal plane and rolling the glass thereon.

4. The step in the process of forming sheet glass which comprises depositing a mass of molten glass upon a table and then tilting the table to accelerate the spread of glass.

5. The step in the process of forming sheet glass which comprises depositing a mass of molten glass upon an inclined table while the surface of the table is changing its degree of inclination.

6. The step in the process of forming sheet glass which comprises depositing a mass of molten glass upon an inclined table, commencing to roll the glass upon said table while the surface of the table is inclined, and thereafter changing the inclination of the table.

7. The method of forming sheet glass which comprises depositing a mass of molten glass upon a table while the surface of the table is inclined, decreasing the inclination of the table, and starting to roll the glass during such decrease in the inclination of the table.

8. The method of forming sheet glass, which comprises depositing a mass of molten glass upon an inclined table, starting to roll the glass while the surface of the table is inclined, and continuing the rolling after the table has been moved to a horizontal position.

9. The method of forming sheet glass which comprises depositing a mass of molten glass upon a table, starting to roll the glass while the surface of the table is in a horizontal position, tilting the table forwardly, and continuing rolling while the table is inclined forwardly and the glass flowing by gravity in the direction of travel of the roll.

10. The method of forming sheet glass which comprises depositing a mass of molten glass upon an inclined table, starting to roll with the table inclined backwardly, the flow of glass being in the opposite direction to and resisting the travel of the roll, continuing the rolling with the table in a horizontal position, further continuing the rolling with the table inclined forwardly, and completing the rolling with the surface of the table in a horizontal position.

11. The method of forming sheet glass, which comprises depositing a mass of molten glass upon an inclined table, starting to roll the glass while the table is in an inclined position, continuing the rolling during this inclination of the table for a substantial distance, moving the table from said position, continuing the rolling after the table becomes again stationary, and further continuing the rolling after moving the table to an inclination opposite to that in which the rolling first started, this latter rolling being continued for a substantial distance.

12. The step in the process of forming sheet glass which comprises depositing a mass of molten glass upon an inclined table, waiting a substantial interval of time for the glass to spread laterally of the table, then starting to roll the glass while the table is in an inclined position.

13. The method of forming sheet glass, which comprises depositing molten glass upon a table, rolling the glass on the table, and varying the angularity of the table during rolling, the table being held at each of a plurality of positions for a substantial period of time.

14. The method of forming sheet glass, which comprises depositing molten glass upon a table, rolling the glass on the table, and varying the angularity of the table during rolling, the glass being rolled for a substantial distance at each of various positions of the table.

15. Apparatus for forming sheet glass which comprises a table upon one end of which molten glass may be deposited preparatory to rolling the same, and means for varying the angularity of the glass-receiving surface with respect to a horizontal plane.

16. Apparatus for forming sheet glass which comprises a table that is convex in cross section upon one end of which molten glass may be deposited preparatory to rolling the same, and means for varying the angularity of the glass-receiving surface with respect to a horizontal plane.

17. Apparatus for forming sheet glass which comprises a table upon one end of which molten glass may be deposited preparatory to rolling the same, means for supporting the table in an inclined position when receiving a mass of molten glass, and means for thereafter reversing the direction of inclination, to cause the glass to flow forwardly of the table under the action of gravity.

18. Apparatus for forming sheet glass comprising a table, a sheet-forming roll, and means for tilting the table during movement of said roll longitudinally of the table.

Signed at Butler, Pa., this 6th day of March, 1926.

GEORGE E. HOWARD.